June 12, 1956 E. M. HICKIN 2,750,505

AUTOMATIC FREQUENCY CONTROL

Filed July 28, 1951 2 Sheets-Sheet 1

INVENTOR.
ERNEST M. HICKIN

BY Laurence B. Dodds
ATTORNEY

INVENTOR.
ERNEST M. HICKIN
BY Laurence B. Dodds
ATTORNEY

United States Patent Office 2,750,505
Patented June 12, 1956

2,750,505

AUTOMATIC FREQUENCY CONTROL

Ernest M. Hickin, Wembley, England, assignor, by mesne assignments, to The General Electric Company Limited, London, England Application July 28, 1951, Serial No. 239,147

Claims priority, application Great Britain August 11, 1950

7 Claims. (Cl. 250—36)

*General*

Figure 1:
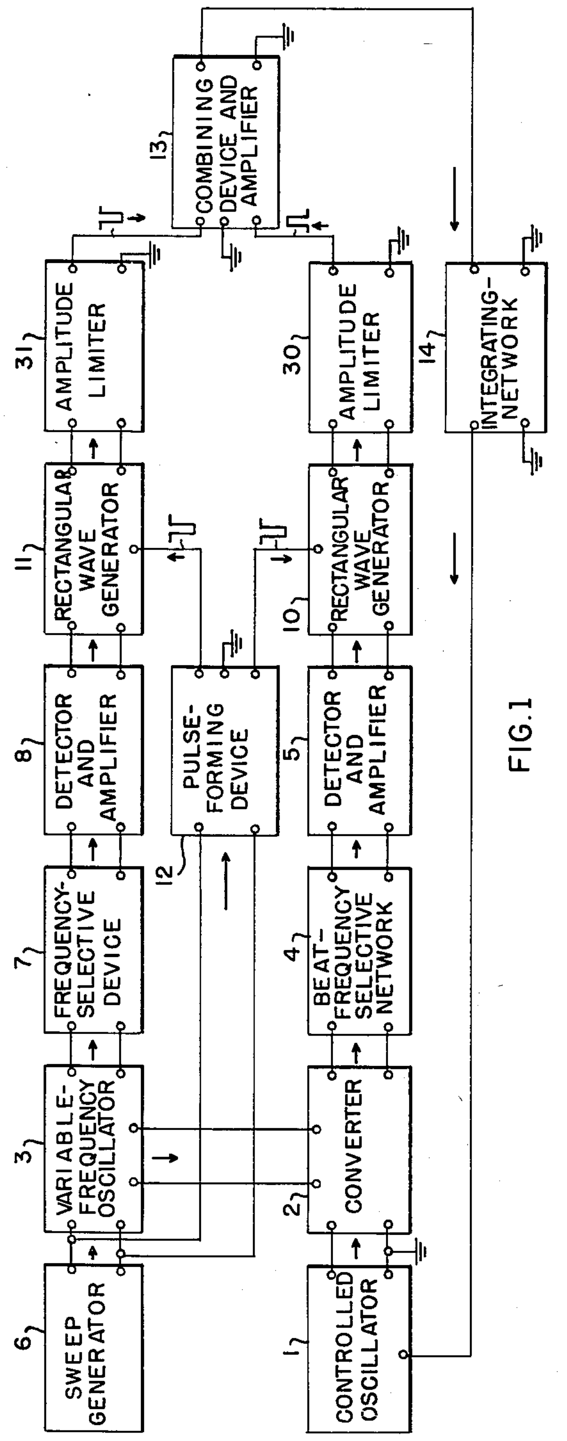

The present invention is directed to automatic control systems and, more particularly, to systems for automatically controlling the frequency of oscillators. The invention is especially useful in maintaining the frequency of an oscillator at a desired value and is particularly adapted to control the frequency of an ultra-high-frequency oscillator of the velocity-modulation type, such as a reflex Klystron.

It is ordinarily quite difficult to maintain substantially constant the frequency of an oscillator operating in the ultra-high frequencies, such as in the region of 24,000 megacycles. For some applications, quartz crystals have been employed to stabilize the frequency of such an oscillator. However, this type of stabilization has not proved to be entirely satisfactory since such crystals are expensive and fragile and, in addition, require relatively costly stages of frequency multiplication starting from a frequency of about 40 megacycles.

It is an object of the present invention, therefore, to provide a new and improved automatic control system for an oscillator which avoids one or more of the abovementioned disadvantages of prior such systems.

It is another object of the invention to provide a new and improved system for automatically controlling the frequency of an ultra-high-frequency oscillator which does not require the use of costly and fragile quartz crystals.

It is a further object of the invention to provide a new and improved automatic control system which is adapted for use in automatically controlling the frequency of an oscillator of the velocity-modulation type.

It is an additional object of the invention to provide a new and improved automatic control system which is suitable for use in stabilizing the frequency of a reflex Klystron.

In accordance with a particular form of the invention, an automatic control system comprises a source of a first signal including an oscillator and a sweep generator coupled thereto for periodically varying the frequency of that signal over a range of frequencies, and a source of a second signal having a frequency which tends to vary and including a frequency-adjusting device. The automatic control system also includes a first selective apparatus responsive to the first signal for developing first substantially rectangular output pulses the leading edges of which are representative of the times when the first signal has a first predetermined frequency. The automatic control system further includes a second selective apparatus coupled to the aforesaid sources for developing second substantially rectangular output pulses having a sense opposite to that of the aforesaid first output pulses and the leading edges of the aforesaid second pulses being representative of the times when the value of the second signal differs from that of the first signal by a second predetermined frequency. The control system additionally includes means coupled to the pulse generators and responsive to the output signal of the sweep generator for simultaneously establishing the trailing edges of the first and second output pulses. The control system also includes a signal-combining device coupled to the first and second apparatus for combining in the aforesaid opposite senses individual ones of the aforesaid output pulses and developing therefrom a control effect representative of the difference between the times the first signal has the aforesaid first predetermined frequency and the times when the frequency of the second signal differs from that of the first signal by the aforesaid second predetermined frequency. The automatic control system also includes a control circuit for applying the control effect to the adjusting device to control the frequency of the second signal.

For a better understanding of the present invention, together with other and further objects thereof, reference is had to the following description taken in connection with the accompanying drawings, and its scope will be pointed out in the appended claims.

Figure 3:
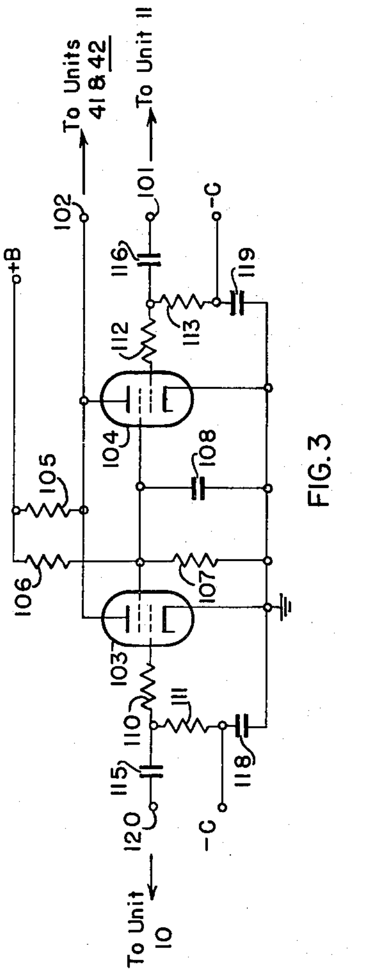
Figure 2:
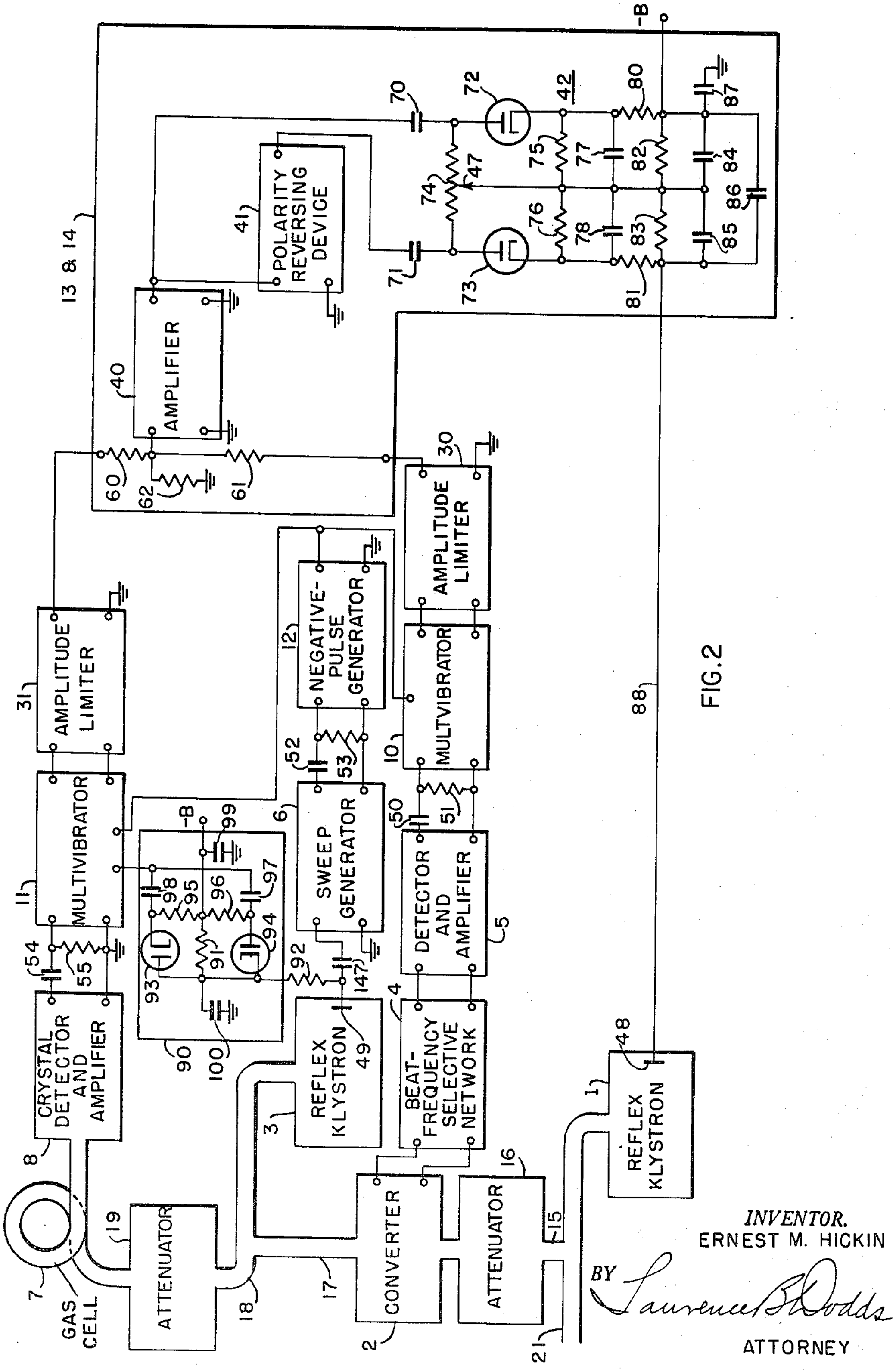

Referring now to the drawings, Fig. 1 is a simplified circuit diagram of an automatic control system in accordance with the present invention and which is useful in understanding the principle of the invention; Fig. 2 is a more elaborate circuit diagram of the automatic control system of Fig. 1 and adapted for use with apparatus operating in the ultra-high-frequency region; and Fig. 3 is a modification of a portion of the system of Fig. 2.

*Description of Fig. 1 system*

Referring now more particularly to Fig. 1 of the drawings, there is represented a source of a first signal which is periodically varied in value or frequency over a range of values or frequencies. This source comprises a variable-frequency oscillator 3, the frequency of which is controlled by a sweep generator 6 in the form of a sawtooth generator which is coupled to the input circuit of the oscillator 3. The automatic control system also includes a source of a second signal comprising a controlled oscillator 1 which has a value or frequency that tends to vary with changes in the operating conditions, for example, with changes in the load thereof. The oscillator 1 includes an adjusting device which may be any of several well-known frequency-adjusting devices and may, for example, be an electrode of an oscillator to which a variable control potential is applied to control the frequency of that oscillator.

The automatic control system further includes a first selective apparatus responsive to the first signal from oscillator 3 for developing first output pulses representative of the times when the aforesaid first signal has a first predetermined value or frequency. This apparatus comprises a frequency-selective device 7, the input circuit of which is coupled to the output circuit of the oscillator 3 and the output circuit of which is coupled in cascade, in the order named, to an amplitude detector and amplifier 8, a rectangular wave generator 11 and an amplitude limiter 31. The device 7 includes a tuned circuit which is resonant at the aforesaid first predetermined frequency and is effective to develop output pulses each time that the output signal of the unit 3 sweeps through that frequency. The units 8, 11 and 31 are also of well-known construction, the rectangular wave generator 11 preferably being a two-tube cathode-coupled multivibrator having two stable operating conditions and being arranged to develop output pulses of negative polarity, the leading edges of which are representative of the times when the signal from the oscillator 3 has the first predetermined frequency corresponding to the resonant frequency of the device 7. A pulse-forming device 12, which may comprise a conventional differentiating circuit, is coupled between the output circuit of the sweep generator 6 and a suitable control electrode of one of the tubes of the multivibrator comprising the rectangular wave generator 11. The device 12 is responsive to the retrace portions of the saw-tooth wave developed by the unit 6 and is effective to derive therefrom pulses of negative polarity for application to the generator 11 to determine the timing of the trailing edges of the output pulses of generator 11. The amplitude limiter 31 is arranged simultaneously to limit the pulses applied thereto at two distinct amplitude levels and develop therefrom output pulses of negative polarity having a predetermined amplitude.

The automatic control system additionally includes a second selective apparatus coupled to the sources comprising the units 1 and 3 for developing second output pulses representative of the times when the value or frequency of the aforesaid second signal from the oscillator 1 differs from that of the first signal from the oscillator 3 by a second predetermined value or frequency. This apparatus includes a conventional converter or mixer 2 of well-known construction, the input circuits of which are coupled to the oscillators 1 and 3 and the output circuit of which is coupled in cascade, in the order named, to a beat-frequency selective network 4, an amplitude detector and amplifier 5, a rectangular wave generator 10 and an amplitude limiter 30. The last two mentioned units have a construction substantially identical with that of units 11 and 31 but are effective to develop output pulses of positive polarity having an amplitude equal to the negative polarity pulses developed in the output circuit of unit 31. To that end, the output of the two-tube multivibrator constituting the rectangular wave generator 10 is taken from the anode of the second tube of that multivibrator rather than from the anode of the first tube as is the case with the multivibrator 11. An input circuit of the generator 10 is coupled to an output circuit of the pulse-forming device 12 which is also effective to apply negative polarity pulses to generator 10 for determining the times of occurrence of the trailing edges of the output pulses developed by the generator 10. The network 4 preferably comprises a tuned circuit which is resonant at the aforesaid second predetermined frequency and comprises a selected beat or difference frequency between the output signal of the oscillator 3 and the output signal of the oscillator 1. The second predetermined frequency is ordinarily very small with relation to the resonant frequency of the frequency-selective device 7, the last-mentioned frequency being substantially equal to that to which the control oscillator 1 is to be stabilized. The network 4 and the unit 5 are arranged to develop an output pulse each time the output signal of the converter 2 has the aforesaid second predetermined frequency.

The automatic control system of the present invention also includes a signal-combining device coupled to the first and second frequency-selective apparatus for combining individual ones of the output pulses thereof and developing therefrom a control effect representative of the difference between the times the first signal from oscillator 3 has the aforesaid first predetermined value or frequency corresponding to the resonant frequency of the device 7 and the times when the value or frequency of the second signal from oscillator 1 differs from that of the first signal from the oscillator 3 by the aforesaid second predetermined value or frequency which comprises the resonant frequency of the beat-frequency selective network 4. This device comprises a signal-combining device and amplifier 13 and an integrating network 14, the input circuits of unit 13 being connected to the output circuits of amplitude limiters 30 and 31 and the output circuit thereof being connected to the input circuit of unit 14. The units 13 and 14 may be of conventional construction.

The control system further includes a control circuit for applying the control effect developed in the units 13 and 14 to the frequency-adjusting device of the oscillator 1 to control the value or frequency of the aforesaid second signal developed by the oscillator 1. This control circuit comprises the electrical connections between the output circuit of the integrating network 14 and the frequency-adjusting device of the oscillator 1.

*Operation of Fig. 1 system*

In considering the operation of the system of Fig. 1, it will be assumed initially that it is intended to stabilize the frequency of the oscillator 1 at substantially that of the resonant frequency of the frequency-selective device 7 or, expressed somewhat differently, should the frequency of the output signal of unit 1 vary, it is desired to adjust the frequency thereof toward equality with the resonant frequency of the unit 7. The sweep generator 6 develops a saw-tooth output wave which is effective periodically to vary the frequency of the output signal of the oscillator 3 over a range of frequencies which includes the resonant frequency of the frequency-selective device 7. At each instant when the frequency of the output signal of oscillator 3 coincides with the resonant frequency of the device 7, there is developed in the output circuit of the unit 8 a positive polarity pulse which is applied to an input circuit of the multivibrator comprising the rectangular wave generator 11. Each pulse supplied to the input circuit of generator 11 from the unit 8 causes the generator 11 to shift from its first stable operating condition to a second such condition until such time as a negative pulse from the device 12 occurring at each retrace interval of the output signal of the generator 6 is applied to an input circuit of the generator 11. Application of each output pulse of device 12 to the generator 11 causes the latter to return to its initial operating condition, thereby establishing the trailing edges of the output pulses of the generator 11. Thus, the occurrence of the leading edges of the output pulses of the generator 11 and the amplitude limiter 31 is representative of the times when the signal from the oscillator 3 has the predetermined frequency of the frequency-selective device 7.

Since the output signals of the oscillators 1 and 3 are applied to the converter 2, there is developed in the output circuit of the latter in the well-known manner a signal having a frequency equal to the difference between the frequencies of the output signals of the units 1 and 3. This difference-frequency signal is applied to the beat-frequency selective network 4 and the unit 5 which develop an output pulse each time the difference-frequency signal has a second predetermined frequency corresponding to the resonant frequency of the network. The output signal of the unit 5 is then applied to the rectangular wave generator 10 which develops output pulses of positive polarity having leading edges which are representative of the times when the frequency of the output signal of the oscillator 1 differs from that of the output signal of the oscillator 3 by the aforesaid second predetermined frequency. Negative output pulses from the pulse-forming device 12 establish the trailing edges of the output pulses from the generator 10 in time coincidence with the trailing edges of the corresponding output pulses of the rectangular wave generator 11. Thus, the pulse-forming device 12 comprises means responsive to the retrace portion of the output signal of the sweep generator 6 for simultaneously establishing the trailing edges of the output pulses of the generators 10 and 11. The output pulses of unit 10 are amplified and limited so that the amplitude of the positive output pulses of unit 30 is substantially equal to the amplitude of the negative output pulses of unit 31.

Corresponding output pulses of the units 30 and 31 are combined in the device 13 which, in turn, produces therefrom a resultant rectangular output pulse having a duration and a polarity dependent on the relative durations of the output pulses from the units 30 and 31. Hence, the resultant output pulses from the unit 13 vary in duration and polarity with the time difference between the leading edges of the input pulses to the unit 13. The resultant output pulses developed by the unit 13 are applied to the integrating network 14 wherein they are smoothed to produce a control effect or voltage for application to the frequency-adjusting device of the oscillator 1. This control effect is of such magnitude and sense as to cause the frequency-adjusting device to make the time difference between the output pulses of the units 7 and 4 more nearly equal to zero and, hence, to make the frequency of the oscillator 1 more nearly equal to a frequency differing from that of the frequency-selective device 7 by the predetermined frequency of the beat-frequency selective network 4. Thus, the automatic control system is effective substantially to stabilize the frequency of the oscillator 1 despite changes in operating conditions.

*Description of Fig. 2 system*

Referring now more particularly to Fig. 2 of the drawings, there is represented a control system which is similar to that represented generally in Fig. 1 and which is suitable for controlling the frequency of an ultra-high-frequency oscillator of the reflection type, sometimes referred to as a reflex Klystron. Units in the Fig. 2 system corresponding to those of Fig. 1 are designated by the same reference numerals. In the description which follows, in general only those circuits which differ from those of Fig. 1 will be described. The oscillators 1 and 3 are both velocity-modulation oscillators of the reflection type, hereinafter referred to for convenience as reflex Klystrons, and include respective repeller electrodes 48 and 49. These oscillators may, for example, be designed to operate at a frequency of approximately 24,000 megacycles. The reflex Klystron 1 is connected through a branch 15 of a main rectangular wave guide 21 and a conventional attenuator 16 to the converter 2 which comprises a crystal mixer. The reflex Klystron 3 is connected to the converter 2 through another rectangular wave guide 17 and is also connected to the frequency-selective device 7 through a wave guide 18 and a conventional attenuator 19. The device 7 is preferably a gas-filled cell comprising a length of rectangular wave guide bent into a substantially circular shape and forming a continuation of the wave guide 18. The device 7 is hermetically sealed at its ends as by means of mica windows and is filled with a suitable gas such as ammonia which exhibits selective absorption in the microwave region. The device 7 is so arranged that the ammonia has an absorption frequency of, for example, 24,000 megacycles. Frequency-selective devices similar to the device 7 are well known in the art and reference is made to the article entitled "Thermal and Acoustic Effects Attending Absorption of Microwaves by Gases," by W. D. Hershberger et al., at pages 422–431 in volume 7 of the RCA Review, for a more detailed description of such a unit.

The unit 8, which is coupled to one end of the device 7, preferably comprises a crystal detector and amplifier which is arranged to translate positive pulses to its output circuit. The latter is coupled to an input circuit of the multivibrator 11 through a conventional differentiating network comprising a series-connected condenser 54 and a parallel-connected resistor 55.

The second frequency-selective apparatus of the Fig. 2 system, comprising the units 2, 4, 5, 10 and 30, includes a differentiating circuit comprising a condenser 50 and a resistor 51 coupled between the output circuit of unit 5 and the input circuit of unit 10 for differentiating the positive output pulses of unit 5. The output circuits of the amplitude limiters 30 and 31 are connected to the input circuit of the units 13 and 14 which together comprise the combining device and amplifier and the integrating network for utilizing the opposite polarity output signals of the units 30 and 31. The limiter 30 is connected through the series combination of resistors 61 and 62 to ground while unit 31 is connected to the junction of those resistors through a resistor 60. The resistor network just described comprises the combining device and is thus arranged to combine each pair of pulses of opposite polarity applied thereto by the units 30 and 31 and produce therefrom resultant output pulses having a duration and polarity dependent on the relative durations of the oppositely directed applied pulses, thus causing each resultant pulse to vary in magnitude and polarity with the time difference between the instants of initiation of the corresponding input pulses to the combining device.

The resultant input pulses of the combining device just described are supplied to an amplifier 40 coupled to the junction of the resistors. The amplified output signal of unit 40 is applied to an integrating network in the form of a balanced rectifier or peak voltmeter 42. The output circuit of the amplifier 40 is coupled to the anode of a rectifier device such as a diode 72 through a coupling condenser 70 and is also coupled to the anode of a similar diode 73 through a polarity-reversing device 41 and coupling condenser 71. The anodes of the diodes 72 and 73 are connected together by a resistor 74 and the cathodes thereof are interconnected by means of series-connected resistors 75 and 76, which are connected in parallel, respectively, with condensers 77 and 78. The junction of the resistors 75 and 76 is connected to an intermediate point on the resistor 74 by means of an adjustable tap 47. The time constants of the resistor-condenser networks 75, 77 and 76, 78 are proportioned so that each of the diodes 72 and 73 acts as a peak detector or voltmeter. The cathodes of the diodes 72 and 73 are also interconnected by means of the series combination of resistors 80, 82, 83 and 81. The resistors 82 and 83, respectively, have condensers 84 and 85 connected in parallel therewith. The junction of the resistors 82 and 83 is connected to the junction of the resistors 75 and 76 and a stabilizing condenser 86 is connected in parallel with the condensers 84 and 85. A source of potential indicated as −B is connected to the junction of the resistors 80 and 82, which junction in turn is connected to ground through a decoupling condenser 87. The elements 80–85, inclusive, comprise a time-delay network for applying the control effect developed in the units 13 and 14 to the repeller electrode 48 of the Klystron 1 by means of a conductive connection 88 between that electrode and the junction of the resistors 81 and 83. The source −B comprises the normal biasing source for the repeller electrode 48 of the Klystron 1.

The input circuit of the sweep generator 6 is coupled to the repeller electrode 49 of the reflex Klystron 3 by means of a coupling condenser 147. The output circuit of the generator 6 is coupled to the input circuit of the negative pulse generator 12 by means of a differentiating circuit comprising a condenser 52 and a resistor 53, the positive output pulse from the differentiating circuit being employed to initiate the operation of the negative pulse generator 12.

The automatic control system preferably includes a centering control device 90 for the reflex Klystron 3, this device ensuring that the Klystron sweeps through a range of frequencies centered equally on either side of the absorption frequency of the ammonia gas in the unit 7. The centering control device 90 includes a pair of diode rectifier devices 93 and 94, the anode of the diode 93 being connected directly to the cathode of the diode 94 and the anode of the latter being connected to the cathode of the former through series-connected resistors 96 and 95. A source indicated as −B is connected to the junction of the resistors 95 and 96 and is in turn connected to the repeller electrode 49 of the Klystron 3 by means of series-connected resistors 91 and 92. The source −B is the normal biasing source for the repeller electrode 49. The junction of the last-mentioned resistors is connected to the cathode of the diode 94 and is by-passed to ground through the condenser 100. A similar by-pass condenser 99 is coupled between the source −B and ground. An output circuit of the multivibrator 11 supplies positive polarity pulses to the cathode of the diode 93 through a coupling condenser 98 and also supplies those pulses to the diode 94 through the coupling condenser 97. These pulses occur in time coincidence with the pulses applied to the amplitude limiter 31.

*Explanation of operation of Fig. 2 system*

From the foregoing descriptions of the Fig. 1 and Fig. 2 embodiments of the invention, it will be seen that the Fig. 2 system is fundamentally the same as that of Fig. 1. Accordingly, it is deemed unnecessary to explain in detail the operation of the Fig. 2 system. Briefly considered, however, the units 7, 8, 11 and 31 of Fig. 2 comprise a first frequency-selective apparatus which develops an output signal of negative polarity which corresponds with that appearing in the output circuit of the unit 31 of the Fig. 1 system. Also the units 2, 4, 5, 10 and 30 comprise a second frequency-selective apparatus which develops in the output circuit of the limiter 30 a positive output pulse corresponding to that developed in the corresponding units of the Fig. 1 system. The output pulses of the units 30 and 31, which are of equal amplitude but of opposite polarity, are combined by the resistive network 60, 61 and 62 so that there appear across the resistor 62 resultant rectangular output pulses which vary in duration and polarity with the time difference between the leading edges of the input pulses to the units 13 and 14. These resultant pulses are applied to the amplifier 40 which in turn applies the amplified pulses to the anode of the diode 72 through the condenser 70, and are also applied to the anode of the diode 73 through the polarity-reversing device 41 and the coupling condenser 71. The polarity of the pulses applied to the anodes of the diodes 72 and 73 may vary depending on whether the leading edges of the output pulses of the limiter 31 occur sooner or later than the leading edges of the corresponding output pulses of the amplitude limiter 30. Each of the diodes 72 and 73 acts as a peak voltmeter so that there is developed across the cathode resistors 75 and 76 a control voltage which varies rapidly in magnitude and sense with variations of the frequency of the Klystron 1 from that of a reference frequency corresponding substantially to the absorption frequency of the device 7, and, in particular, to a reference frequency differing from the resonant frequency of the unit 8 by the resonant frequency of the unit 4. The voltage developed across the resistors 75 and 76 is delayed by the elements 80–85, inclusive, prior to application to the repeller electrode 48 of the Klystron 1. This delaying action is to ensure the stability of operation of the Klystron 1. The normal bias for the repeller electrode 48 is developed by the source —B and the control effect developed across the resistors 82 and 83 by the action of the peak voltmeter including the diodes 72 and 73 is of proper sense to adjust the frequency of the Klystron 1 toward equality with the resonant frequency of the device 7.

The purpose of the centering control device 90 is to ensure that the reflex Klystron 3 develops an output signal which sweeps equally on either side of the resonant frequency of the device 7, for example ±15 megacycles relative to the 24,000 megacycle frequency. Rectangular waves of positive polarity are applied to the cathode of the diode 93 and to the anode of the diode 94 through the coupling condensers 98 and 97, respectively. If the Klystron 3 is sweeping over a range of frequencies, the extreme frequencies of which are displaced equally on either side of the absorption frequency of the ammonia gas of the device 7, each positive-going portion of the pulse from unit 11 will occur at the midpoint of the saw-tooth wave form produced by the sweep generator 6, while the negative-going portion of the pulse supplied from the unit 11 will occur in the retrace portion of the saw-tooth wave mentioned above. This in turn produces equally timed positive and negative rectangular waves for application to the diodes 93 and 94 so that they are rendered conductive for equal intervals of time. Consequently, no net voltage difference appears across the resistor 91. However, if the frequency of the reflex Klystron 3 is too high, the positive-going portion of the pulse from the multivibrator 11 occurs at an earlier portion of the saw-tooth wave developed by the generator 6. This takes place since the pulse produced in the output circuit of unit 8 when the frequency of the reflex Klystron 3 coincides with that of the absorption frequency of the ammonia gas of the device 7 occurs sooner in time than if the frequency of the Klystron 3 were lower. As a result, the diode 94 conducts for a longer interval than the diode 93 and a potential is produced across the resistor 91 of such value to decrease the normal operating potential applied to the repeller electrode 49 by the source —B. This in turn decreases the frequency swing of the Klystron 3 above that of the resonant frequency of the device 7. If the frequency swing of the Klystron 3 on the other side of the resonant frequency of the device 7 is too low, the potential developed across the resistor 91 is in such sense as to supplement the negative biasing potential supplied by the source —B to the repeller electrode 49, thus increasing the frequency swing in the proper sense.

*Description of the Fig. 3 apparatus*

Referring now to Fig. 3 of the drawings, there is represented schematically an apparatus which may be employed in lieu of the units 30 and 31, the resistor network 60–62, inclusive, and the amplifier 40 of the Fig. 2 system. The apparatus of Fig. 3 includes an input terminal 120, which is adapted to be coupled to the output circuit of the multivibrator 10 of Fig. 2, and is coupled to the control electrode of a tetrode 103 through a coupling condenser 115 and a resistor 110. A biasing source indicated as —C is coupled to the control electrode of the tube 103 through a resistor 111 and the resistor 110 and is connected to ground through a decoupling condenser 118. An input terminal 101 is adapted to be coupled to the output circuit of the multivibrator 11 of Fig. 2 and is also coupled to the control electrode of a tetrode 104 through a coupling condenser 116 and a resistor 112. The biasing source of —C is coupled to the control electrode of the tube 104 by means of a resistor 113 and the resistor 112, and a decoupling condenser 119 is connected between the source and ground. The anodes of the tubes 103 and 104 are connected through a resistor 105 to a source of positive potential indicated as +B, and are also connected directly to an output terminal 102 which is adapted to be coupled to the units 41 and 42 of the Fig. 2 system. Screen potential is supplied to the interconnected screen electrodes of the tubes 103 and 104 from the source +B through a voltage-divider network comprising resistors 106 and 107. The screen electrodes of the tubes are also connected to ground through a decoupling condenser 108 and the cathodes of the tubes are directly connected to ground.

*Operation of Fig. 3 apparatus*

In operation, positive polarity pulses are applied to the control electrode of the tube 103 and negative polarity pulses are applied to the control electrode of the tube 104. The negative bias afforded by the source —C coupled to the control electrode of both tubes produces an amplitude-limiting effect. As a result, rectangular output pulses appearing at the anodes of the tubes 103 and 104 have a duration and polarity which vary in accordance with the relative durations of the pulses applied to the control electrodes of the tubes.

From the foregoing description of various embodiments of the invention, it will be seen that an automatic control system in accordance with the present invention is particularly suited for use in automatically controlling the frequency of a velocity-modulation oscillator of the reflection type. It will also be clear that an automatic control system in accordance with the invention does not require the use of costly and fragile crystals.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade a frequency-selective device, a differentiating circuit, and a first pulse generator responsive to said first signal for developing first substantially rectangular output pulses the leading edges of which are representative of the times when said first signal has a first predetermined frequency; a second frequency-selective apparatus coupled to said sources and including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; means coupled to said pulse generators and responsive to the output signal of said sweep generator for simultaneously establishing the trailing edges of said first and second output pulses; a signal-combining device coupled to said pulse generators for combining in said opposite senses individual ones of said output pulses and developing therefrom a control effect representative of the difference between the times said first signal has said first predetermined frequency and the times when the frequency of said second signal differs from that of said first signal by said second predetermined frequency; and a control circuit for applying said control effect to said frequency-adjusting device to control the frequency of said second signal.

2. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade a gas-filled device effectively resonant at a first predetermined frequency, a differentiating circuit, and a first pulse generator and responsive to said first signal for developing first substantially rectangular output pulses the leading edges of which are representative of the times when said first signal has said first predetermined frequency; a second frequency-selective apparatus coupled to said sources and including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; a means coupled to said pulse generators and responsive to the output signal of said sweep generator for simultaneously establishing the trailing edges of said first and second output pulses; a signal-combining device coupled to said pulse generators for combining in said opposite senses individual ones of said output pulses and developing therefrom a control effect representative of the difference between the times said first signal has said first predetermined frequency and the times when the frequency of said second signal differs from that of said first signal by said second predetermined frequency; and a control circuit for applying said control effect to said frequency-adjusting device to control the frequency of said second signal.

3. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade an enclosure filled with ammonia gas having a predetermined absorption frequency, a differentiating circuit, and a first pulse generator and responsive to said first signal for developing first substantially rectangular output pulses the leading edges of which are representative of the times when said first signal has said absorption frequency; a second frequency-selective apparatus coupled to said sources including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; means coupled to said pulse generators and responsive to the output signal of said sweep generator for simultaneously establishing the trailing edges of said first and second output pulses; a signal-combining device coupled to said pulse generators for combining in said opposite senses individual ones of said output pulses and developing therefrom a control effect representative of the difference between the times said first signal has said absorption frequency and the times when the frequency of said second signal differs from that of said first signal by said second predetermined frequency; and a control circuit for applying said control effect to said frequency-adjusting device to adjust the frequency of said second signal toward equality with that of said absorption frequency.

4. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade a frequency-selective device, a differentiating circuit, and a first pulse generator responsive to said first signal for developing first substantially rectangular output pulses the leading edges of which are representative of the times when said first signal has a first predetermined frequency; a second frequency-selective apparatus coupled to said sources including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; means coupled to said pulse generators and responsive to the output signal of said sweep generator for simultaneously establishing the trailing edges of said first and second output pulses; a signal-combining device having a pair of input circuits individually coupled to said pulse generators and having a common resistive load circuit for combining in said opposite senses individual ones of said output pulses and developing therefrom a control effect representative of the difference between the times said first signal has said first predetermined frequency and the times when the frequency of said second signal differs from that of said first signal by said second predetermined frequency; and a control circuit for applying said control effect to said frequency-adjusting device to control the frequency of said second signal.

5. An automatic control system comprising: a source of a first signal including a first velocity-modulation oscillator of the reflection type and a sweep generator coupled thereto for periodically varying the frequency of said signal over a range of frequencies; a second velocity-modulation oscillator of the reflection type for developing a second signal having a frequency which tends to vary and including a frequency-adjusting repeller electrode; a first frequency-selective apparatus including in cascade a frequency-selective device, a differentiating circuit, and a first pulse generator responsive to said first signal for developing first substantially rectangular output pulses the leading edges of which are representative of the times when said first signal has a first predetermined frequency; a second frequency-selective apparatus coupled to said oscillators and including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; differentiating circuit means coupled between said sweep generator and said pulse generators for developing output pulses simultaneously establishing the trailing edges of said first and second output pulses; a signal-combining device coupled to said pulse generators for combining in said opposite senses individual ones of said output pulses and developing therefrom a control effect representative of the difference between the times said first signal has said first predetermined frequency and the times when the frequency of said second signal differs from that of said first signal by said second predetermined frequency; a control circuit for applying said control effect to said frequency-adjusting electrode to control the frequency of said second signal; and a rectifier system coupled between said first pulse generator and said frequency-adjusting electrode and responsive to said first output pulses for deriving and applying a control voltage to said electrode to maintain said frequency variation of said first-mentioned signal uniform with respect to a center frequency within said range of frequencies.

6. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade a frequency-selective device, a differentiating circuit, and a first pulse generator responsive to said first signal for developing first substantially rectangular output pulses the leading edges of which are representative of the times when said first signal has a first predetermined frequency; a second frequency-selective apparatus including a frequency converter coupled to said sources and including in cascade a frequency-selective device, a differentiating circuit, and a second pulse generator for developing second substantially rectangular output pulses having a sense opposite to that of said first output pulses and the leading edges of said second output pulses being representative of the times when the frequency of said second signal differs from that of said first signal by a second predetermined frequency; differentiating circuit means coupled between said sweep generator and said pulse generators for developing output pulses simultaneously establishing the trailing edges of said first and second output pulses; a signal-combining device including a pair of electron-discharge devices having individual input circuits coupled to said pulse generators and having a common resistive output circuit for combining in said opposite senses individual ones of said output pulses and developing therefrom a control effect representative of the difference between the times said first signal has said first predetermined frequency and the times when the frequency of said second signal differs from that of said first signal by said second predetermined frequency; and a control circuit for applying said control effect to said frequency-adjusting device to control the frequency of said second signal.

7. An automatic control system comprising: a source of a first signal including an oscillator and a sweep generator coupled thereto for periodically varying the frequency of said signal over a range of frequencies; a source of a second signal having a frequency which tends to vary and including a frequency-adjusting device; a first frequency-selective apparatus including in cascade a frequency-selective device, a differentiating circuit, and a first pulse generator responsive to said first signal for developing first substantially rectangular output pulses the leading edges of which are representative of the times when said first signal has a first predetermined frequency; a second frequency-selective apparatus including a frequency converter coupled to said sources and including in cascade a tuned circuit coupled to said converter and resonant at a second predetermined frequency, a differentiating circuit, and a second pulse generator for developing second substantially rectangular output pulses having a sense opposite to that of said first output pulses and the leading edges of said second output pulses being representative of the times when the frequency of said second signal differs from that of said first signal by said second predetermined frequency; means coupled to said pulse generators and responsive to the output signal of said sweep generator for simultaneously establishing the trailing edges of said first and second output pulses; a signal-combining device including a pair of electron-discharge devices having individual input circuits coupled to said pulse generators and having a common resistive output circuit for combining in said opposite senses individual ones of said output pulses and developing therefrom a control effect representative of the difference between the times said first signal has said first predetermined frequency and the times when the frequency of said second signal differs from that of said first signal by said second predetermined frequency; and a control circuit for applying said control effect to said frequency-adjusting device to control the frequency of said second signal.

References Cited in the file of this patent

UNITED STATES PATENTS

| | | |
|---|---|---|
| 2,462,294 | Thompson | Feb. 22, 1949 |
| 2,559,719 | Hershberger | July 10, 1951 |
| 2,564,005 | Halpern et al. | Aug. 14, 1951 |
| 2,564,059 | Gensel | Aug. 14, 1951 |
| 2,584,608 | Norton | Feb. 5, 1952 |
| 2,631,269 | Norton | Mar. 10, 1953 |
| 2,699,503 | Lyone et al. | Jan. 11, 1955 |